(12) United States Patent
Schwab

(10) Patent No.: US 11,149,897 B2
(45) Date of Patent: Oct. 19, 2021

(54) PIG FOR A COATING DEVICE, AND COATING SYSTEM

(71) Applicant: EISENMANN SE, Boeblingen (DE)

(72) Inventor: Stephan Schwab, Waldenbuch (DE)

(73) Assignee: EISENMANN SE, Böblingen (DE)

( * ) Notice: Subject to any disclaimer, the term of this patent is extended or adjusted under 35 U.S.C. 154(b) by 77 days.

(21) Appl. No.: 15/738,239

(22) PCT Filed: Jun. 14, 2016

(86) PCT No.: PCT/EP2016/063586
§ 371 (c)(1),
(2) Date: Dec. 20, 2017

(87) PCT Pub. No.: WO2017/001186
PCT Pub. Date: Jan. 5, 2017

(65) Prior Publication Data
US 2018/0180214 A1    Jun. 28, 2018

(30) Foreign Application Priority Data

Jun. 29, 2015 (DE) ............. 10 2015 008 216.7

(51) Int. Cl.
| | | |
|---|---|---|
| *F16L 55/48* | (2006.01) |
| *B05B 12/14* | (2006.01) |
| *B05B 12/08* | (2006.01) |
| *F16L 55/28* | (2006.01) |
| *F16L 101/12* | (2006.01) |
| *F16L 101/30* | (2006.01) |
| *F16L 101/40* | (2006.01) |

(52) U.S. Cl.
CPC ............. *F16L 55/48* (2013.01); *B05B 12/08* (2013.01); *B05B 12/1481* (2013.01); *F16L 55/28* (2013.01); *F16L 2101/12* (2013.01); *F16L 2101/30* (2013.01); *F16L 2101/40* (2013.01)

(58) Field of Classification Search
None
See application file for complete search history.

(56) References Cited

U.S. PATENT DOCUMENTS 6,553,322 B1 * 4/2003 Ignagni ............... F16L 55/48
701/32.4
2009/0128136 A1 5/2009 Hablizel
(Continued)

FOREIGN PATENT DOCUMENTS

| CN | 104 613 320 | 5/2015 |
| CN | 105 899 305 | 8/2016 |

(Continued)

OTHER PUBLICATIONS

Machine Translation of EP 1314480 A1 (Year: 2003).*

*Primary Examiner* — Shamim Ahmed
*Assistant Examiner* — Bradford M Gates
(74) *Attorney, Agent, or Firm* — Schroeder Intellectual Property Law Group, LLC

(57) ABSTRACT

A pig for a coating device wherein the coating device has a line system that can be pigged, wherein the pig has an RFID transponder, which is designed to store and/or to transmit and/or to receive data by means of the RFID technology. A coating system for coating an object with a coating material and to a method for controlling a coating system.

13 Claims, 2 Drawing Sheets

(56) References Cited

U.S. PATENT DOCUMENTS

2012/0118085 A1     5/2012   Christie
2016/0319980 A1    11/2016   Hofer et al.

FOREIGN PATENT DOCUMENTS

| | | |
|---|---|---|
| DE | 103 39 353 | 4/2005 |
| DE | 10 2006 035 258 | 2/2007 |
| DE | 10 2007 004 820 | 8/2008 |
| DE | 10 2007 054 969 | 5/2009 |
| DE | 10 2012 009 347 | 11/2013 |
| EP | 1 314 480 | 5/2003 |
| JP | H08-105905 | 4/1996 |
| JP | 2000-310389 | 11/2000 |
| JP | 2007-098389 | 4/2007 |
| JP | 2007-132740 | 5/2007 |
| JP | 2017-510449 | 4/2017 |
| WO | 2015/101676 | 7/2015 |

\* cited by examiner

PIG FOR A COATING DEVICE, AND COATING SYSTEM

RELATED APPLICATIONS

This application is a national phase of International Patent Application No. PCT/EP2016/063586 filed Jun. 14, 2016, which claims the filing benefit of German Patent Application No. 10 2015 008 216.7 filed Jun. 29, 2015, the contents of both of which are incorporated herein by reference.

BACKGROUND OF THE INVENTION

Coating systems for items such as for example vehicle bodies are nowadays often designed such that they can be pigged. On the one hand, pigging systems allow a separation of coating materials that direct follow one another and can be used for the cleaning and/or inspection of the pipeline system. In coating technology, it is generally known to transport coating material through a line with the aid of a pig, for example from a supply source to another location, in particular to an application device. On the other hand, the pig may also be transported on its own, for example for cleaning the line. The movements of the pig are monitored with the aid of devices, in particular when it is present at various pigging stations.

Such a monitoring device is described in DE 10 2007 054 969 A1. The basic idea there is to integrate a magnet in a pig and to detect the presence of a pig, for example in a pigging station, with the aid of a sensor that is sensitive to the magnetic field. If a multiplicity of sensors are arranged one behind the other in the direction of movement of the pig, along the path that the pig takes within a line, a sensor signal can be generated in each of these sensors as it passes through. In this way, the pig can be tracked along the path and the location and speed of the pig can be determined.

However, this type of detection of the whereabouts of the pig by means of magnets has disadvantages: locating is only possible at previously established sensor points of the line system. If the pig is not within the range of such a sensor station, it is not possible to ascertain the whereabouts of the pig. The setting up of sensors is costly and must be planned with the design of the line system. Then there is also the fact that the information transported by way of the magnet of the pig is just restricted to the location, and indirectly to the speed and the orientation of the pig. Information that goes beyond this cannot be coded by means of this technology.

SUMMARY OF THE INVENTION

It is an object of the invention to provide a pig for a coating device and also a coating system that can be manufactured at low cost and offer a greater information density than conventional systems.

The object may be achieved by a pig for a coating device, a coating system and a method for controlling a coating system according to the independent claims. Further refinements of the invention are specified herein.

The pig according to the invention for a coating device, in particular for a coating device for coating vehicle bodies, wherein the coating device has a piggable line system, has an RFID transponder, which is designed to store and/or to send and/or to receive data by means of RFID technology. An RFID transponder is a comparatively small component that can be integrated well into the geometry of a pig. An RFID transponder can be detected over relatively great distances and offers the possibility of storing information.

The information to be stored on an RFID transponder can for example be stored onto the RFID transponder at a first point and read from it at a second point. The information that can be linked with the pig by means of an RFID transponder has a much greater information density than the conventional magnet technology. The writing/reading capability that is possible by means of the RFID transponder allows temporally and spatially different information to be transported or stored or read out with the pig.

According to a preferred embodiment, it may be provided that the data comprise pig-specific data, in particular data concerning a location and/or a speed and/or an identification and/or a running time and/or an alignment and/or a date of manufacture and/or a use-by date and/or an operating time and/or a number of operating cycles of the pig. Therefore, the information that can likewise be determined with conventional technology, such as the location and/or speed, can be determined in a low-cost way. At the same time, the technology according to the invention offers the possibility of determining, storing or reading out a multitude of further pig-specific data by means of the RFID transponder. A particular advantage here is the fact that the data are physically linked to the pig by means of the RFID transponder. Therefore, storing and reading out the data stored on the pig can be performed without a centralized data system. This results in a multitude of advantages. For example, the actual time for which a pig has been used in an application can be checked by the manufacturer, for example when claims are being made under a warranty. The same information may also be useful for assessing the still possible remaining service life of the pig. It may also be of interest in this connection if the data permit a unique identification of the pig. The identification may be for example be a unique production identification that is stored in the pig when it is manufactured. Alternatively or additionally, it may also be that a coding of the pig that is unique to the coating device and/or to the coating operation is to be allocated, and possibly stored on the pig, when the pig is introduced into the coating device or when the pig is detected for the first time or at some other suitable point in time.

In the case of a further advantageous embodiment, it may additionally or alternatively be provided that the data comprise coating-specific data, in particular coating operation data and/or coating material data. Therefore, in addition or as an alternative to data that primarily concern the pig itself as a component, data that concern the material that comes into contact with the pig may also be stored and read out. This may for example be material data, which permit an identification of the material itself or specify physical/chemical properties of the material. Additionally or alternatively, data that can be used for controlling operations in which the material that comes into contact with the pig is used can be stored on the pig and read out. For example, in the case of transporting coating material by the pig, data that are necessary for the application of the material may be stored on the RFID transponder and read out.

Additionally or alternatively, in the case of a preferred embodiment, the data may comprise item-specific data, in particular vehicle body data. Data that provide particulars about the item to be coated may likewise be of relevance, for example in the application of the coating material.

Altogether, the integration of an RFID transponder in a pig offers a series of advantages. On the one hand, right through from the arrival of the coating material and/or the item to be coated in or at the coating device, data can be entered in the pig by the RFID transponder, buffer-stored and passed on after reading out. This permits a continuity of the information flow, so that a data transfer from the raw material or semifinished product to the finished product can be achieved in a reliable and easy way without a centralized data system, with the inherent complexity and susceptibility to errors that involves. At the same time, it is possible to store and keep data concerning the pig directly on or in the pig without having to set up a centralized data structure. A further advantage is that of detecting the pig by means of RFID technology. This is explained in more detail below with reference to a coating system according to the invention.

The coating system according to the invention for coating an item with a coating material has an application device for applying the coating material to the item, a piggable line system for supplying the application device with the coating material and also a pig according to the invention. By means of the pig, it is possible to realize a data flow right through from the coating material for example to the application device and/or to the item that is to be coated or has been coated.

According to an advantageous embodiment, the coating system has an RFID reading/writing device, which is designed to communicate with the RFID transponder. The term RFID reading/writing device is intended to refer to a device that can only read, can only write or can both read and write. Correspondingly, the term "communicate" is intended to refer to unidirectional communication and bidirectional communication.

The RFID reading/writing device may preferably be designed to write the data, in particular coating operation data and/or coating material data, onto the RFID transponder at a first pigging station and/or to read the data from the RFID transponder at a second pigging station. This makes it possible for data to be transported or passed on in an easy and low-cost way without a centralized data processing system.

Furthermore, it may be advantageously provided that the RFID reading/writing device is designed to determine the location and/or speed of the pig from a signal emitted by the RFID transponder. For this purpose, the RFID reading/writing device may be equipped with one or more suitable antennas for picking up the signal. The location and/or speed data of the pig captured in this way can in turn be stored on the RFID transponder. An antenna may be arranged in a suitable way in the vicinity of the line system that is traveled through by the pig.

For example, the place of attachment and the alignment of the antenna may be chosen such that only a certain limited section of the line undergoes data capture. This realizes a selectivity of the capture of the RFID signal and could be achieved for example by aligning the capture range perpendicularly to the course of the line. Alternatively, the place of attachment and the alignment of the antenna may be chosen such that the capture range of the antenna is aligned parallel to the course of the line, and consequently also to the direction of movement of the RFID transponder. This allows for example the multiple capture of an RFID signal with an antenna, and thereby possibly easier determination of the speed of a pig.

The antenna may for example be arranged around a line, for example wound, for instance as a spiral. Alternatively or additionally, the antenna may be fixedly connected to the material of the line or be incorporated in the material of the line. If the line is a tube with structurally woven fabric, the antenna may be integrated in the fabric of the tube. Depending on the application, various geometries may be used for the antenna.

In the case of an advantageous refinement of the coating system, a control device, which is designed to activate the application device in dependence on the data, may be provided. In this case, the data stored by means of RFID technology on the RFID transponder may for example serve for verification of the data fed to the application device by another information system.

The idea according to the invention is also realized by a method for controlling a coating system. The method according to the invention comprises the steps of:
storing coating-relevant data by means of RFID technology onto a pig at a first pigging station; moving the pig from the first pigging station to a second pigging station; reading the data located on the pig by means of RFID technology at the second pigging station; activating the application device with the data read.

In the case of a preferred embodiment of the method, controlling the application device comprises verifying the data read with further coating-relevant data provided by the control device.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

The invention is now explained in more detail with reference to the drawings, in which.

DETAILED DESCRIPTION OF THE PRESENT INVENTION

Figure 1:
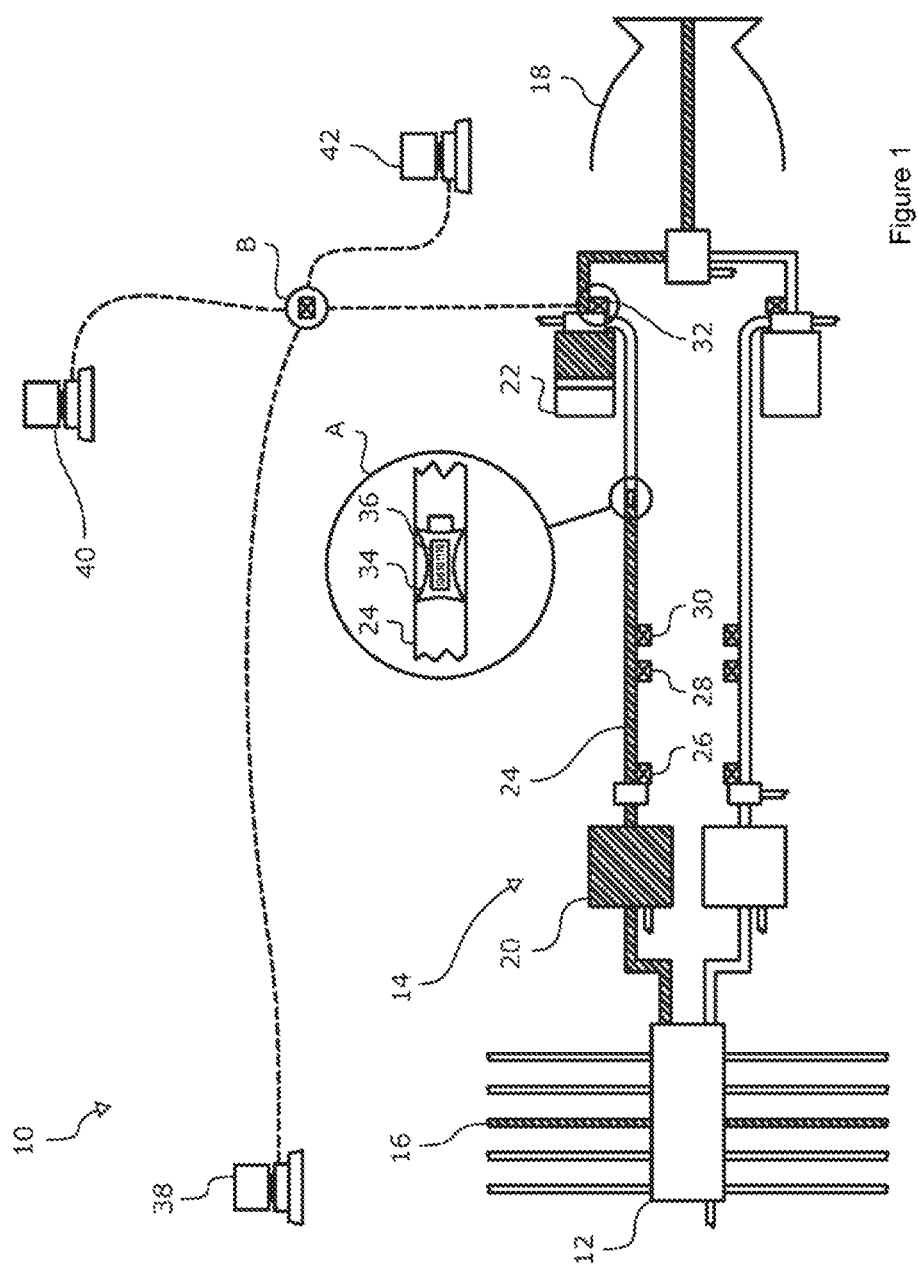
FIG. 1 shows a detail of a piggable line system of a coating system according to the invention with a pig according to the invention.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

FIG. 1 shows in a schematic representation a detail of a coating system 10. The coating system 10 comprises a color changer 12 and various line elements 14 connected to the color changer, which are not to be fully discussed here in detail. Coating material 16 is fed to the color changer 12 from a coating material container that is not depicted in FIG. 1. In the exemplary embodiment represented, the coating material 16 is fed to a rotary atomizer 18 by way of said line and coating system elements 14. Provided within the line system 14 are a first pigging station 20 and a second pigging station 22. A number of writing/reading devices 26-32 are provided along a supply line 24 leading from the first pigging station 20 to the second pigging station 22.

Arranged in the supply line 24 is a pig 34. The pig 34 can be introduced by way of the first pigging station 20 and/or the second pigging station 22 into the line system, represented here by way of example by the supply line 24, be moved in it and removed again. The pig 34 is provided with an RFID transponder 36. This is represented in the enlarged detail A. As represented in detail B, the writing/reading device 32 is connected to a number of individual controllers, preferably to all the individual controllers, of the coating system 10. In the present embodiment, these are a material supply controller 38, a production controller 40 and an application controller 42.

Both the writing/reading device 32 and the writing/reading devices 26-30 are designed to write data to the RFID transponder 36 and to read data and/or signals from the RFID transponder 36. It may be provided in this respect that each writing/reading device is assigned an antenna. Individual (possibly also all of the) writing/reading devices may be designed for exclusive positional detection of the RFID transponder 36, and consequently also of the pig 34. The writing/reading devices 26, attached to the pigging stations 20, 22 are preferably designed for bidirectional communication, while the writing/reading devices 28, 30 only have a detecting function and accordingly are designed only for unidirectional communication.

Figure 2:
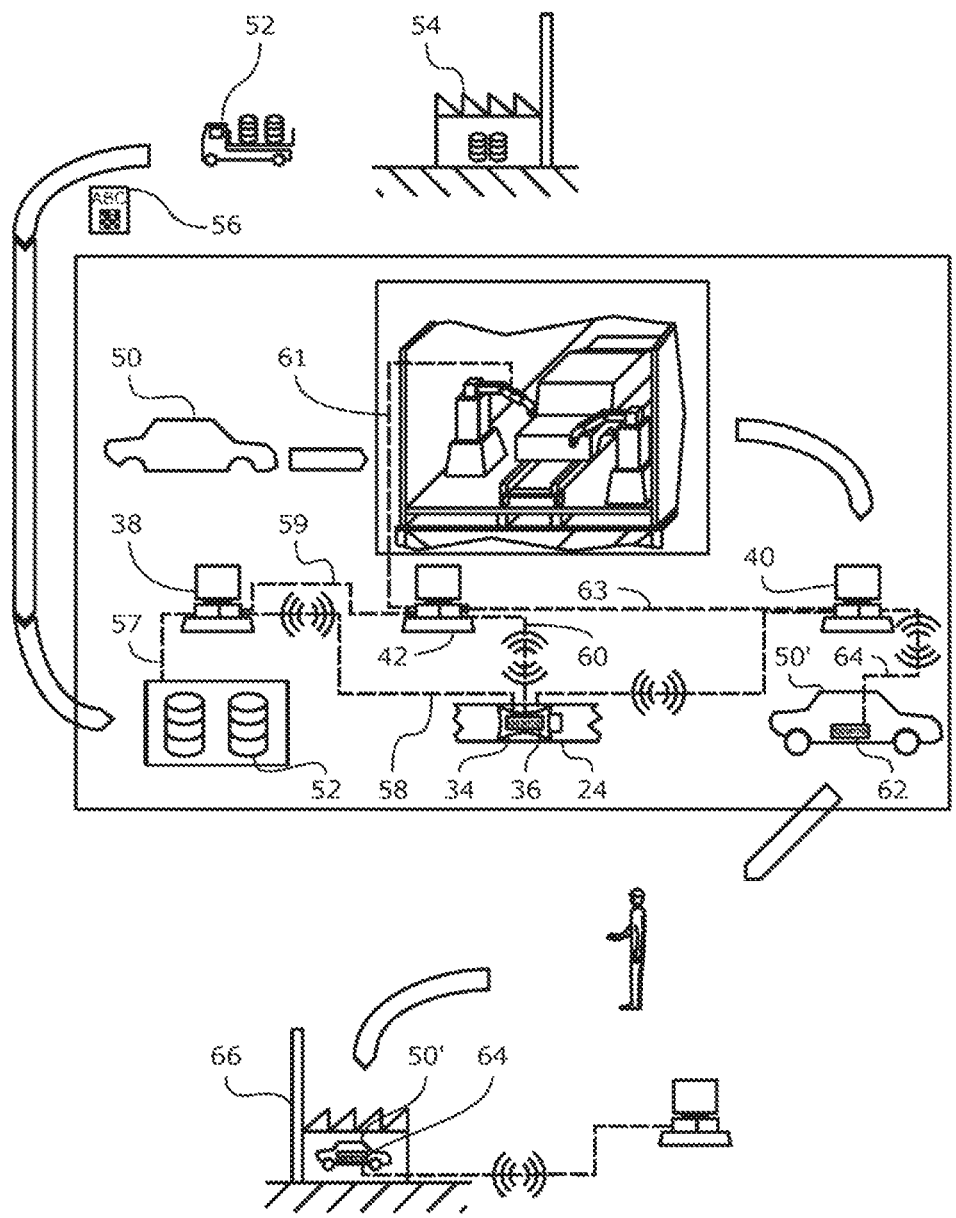
FIG. 2 shows a schematic representation for explaining the operating principle of a coating system according to the invention.

FIG. 2 shows in a schematic representation the setup of the coating system 10 and of further operations connected with the coating system 10. In the representation of FIG. 2, the actual coating system carrying the coating material 16 is reduced to the supply line 24 with the pig 34 located in it, and also the RFID transponder 36. For better illustration of the functionality of the RFID system, various production states of an item to be coated, here a vehicle body 50, and of the coating material used for the coating, here a body paint 16, are illustrated in FIG. 2.

Apart from a vehicle body, the item to be coated may also be individual vehicle components or other items to be coated. Apart from a paint, the coating material may also be an adhesive, a sealing compound or the like.

The paint 16 is manufactured in a production facility 54 remote from the coating system 10 and brought to the coating system 10 in a coating material container 52. Data that concern the coating material, that is to say here the body paint 16, and instructions for its storage, preparation, handling and/or application may be noted for example on a label 56, which may be attached to the container 52 containing the body paint 16. With the arrival of the coating material 16 at the coating system 10 or at some other suitable point in time, the information located on the label 56 is captured by the material supply controller 38. The capture of the data may be performed for example by an optical reading of the label 56 and is represented in FIG. 2 as transmission path 57. It goes without saying that an RFID data transmission technology could also already be used at this point, with the aid of which the data of the coating material can be transferred from a label 56 correspondingly provided with an RFID transponder to the material supply controller 38.

The information obtained about the coating material, that is to say for example the paint 16, is transferred from the material supply controller 38 to the pig 34, or respectively the RFID transponder 36, by means of an RFID transmission. This is represented in FIG. 2 by the dashed line 58, which symbolizes the RFID transmission path.

The RFID transmission operation represented here and all other RFID transmission operations mentioned and described may be unidirectional transmission or bidirectional transmission, according to the requirement.

If the coating material, that is to say for example the paint 16, is introduced into the line system 14 of the coating system by way of the color changer 12, the pig 34 can transport information concerning the paint 16 by means of the RFID transponder 36, for example from the first pigging station 20 to the second pigging station 22.

If the second pigging station 22 is in the vicinity of the rotary atomizer 18, the pig 34 that has reached there can transmit the information stored on the RFID transponder 36 to the application controller 42, which in turn communicates with the rotary atomizer 18, or more generally with the applicator 59, by means of a communication line 61. At the same time or alternatively, the application controller 42 may transfer to the RFID transponder 36 the parameters that are used in the application of the coating material, that is to say for example the paint 16. This transmission path is illustrated in FIG. 2 as a dashed line 60.

The transfer of the data from the RFID transponder 36 to a writing/reading device and from a writing/reading device to the RFID transponder 36 of the pig 34 may for example be synchronized with the timing of a production cycle. The already mentioned production controller 40 may on the one hand likewise be connected to a writing/reading device 32 as shown in FIG. 1 and/or to the material supply controller 38, the application controller 42 and/or to a central controller. This is illustrated by the transmission path 59 between the material supply controller 38 and the application controller 42 and also by the transmission path 63 between the application controller and the production controller 40. A dedicated central controller is not represented in the embodiment shown in FIG. 1, the function of which can for example be undertaken by the production controller 40.

In this way, the production controller has access to the data stored in the RFID transponder 36 and with this database—as represented by way of example in FIG. 2—can transfer the data that have accumulated in the RFID transponder 36 during the coating process to the finished coated vehicle body 50, and there in particular likewise to an RFID transponder 62. This is symbolically represented as RFID transmission path 64.

In this case it is possible for example for the data originally transmitted by the coating material manufacturer 54, such as for example the color, the coating material system or the like, to be stored on the RFID transponder 62, and also possibly different or supplementary data, which have for example been collected in the material supply controller 38 and may for example relate to an actual mixing ratio, a pressure used during the application, prevailing air-pressure and/or ambient-temperature conditions or the like.

The same applies to the capture of application-specific data by the application controller 42. These may be stored as target data—i.e. as planned control data—on the pig RFID transponder 36, and consequently be as it were buffer-stored. At the same time or alternatively, measured or actual data actually captured during the application of the coating material 16 may also be recorded and stored on the pig RFID transponder 36.

In addition, pig-specific data may also be captured at the application controller 42 or the material supply controller 38, such as for example the overall pig running time, the running time of a pig in the respective application operation, the alignment thereof or the like. These can be read out during reading out of the data at one of the writing/reading devices 26-38 and be transmitted to the production controller 40, for example for preventive maintenance, for capturing statistical data and/or for fault detection. Thus, for example, possible wear of the pig 34 can be deduced from a pig speed or running time that has changed while conditions have otherwise remained the same. This transmission and evaluation of the data may advantageously be performed independently of a central data acquisition, since all pig-relevant data are stored on the pig RFID transponder 36 and can be read out.

In this way, the data concerning the coating material 16 itself and concerning the coating operation carried out on the vehicle body 50 can be captured right through from the arrival of the coating material 16 in the coating system 10 to when the vehicle body 50 leaves, then as vehicle 50', and be captured on the coated item itself, for example in the transponder 64 assigned to the vehicle body 50, and stored decentrally or passed on.

Apart from the complete continuity of the coating system 10 with regard to the capturing and passing on of coating-relevant data, the RFID-based communication described offers the possibility of easy and low-cost detection of the pig 34 by means of one or more writing/reading devices 26-32. The choice of suitable antennas and a corresponding evaluation of the RFID signals allow both the location and the speed of the pig 34 in the line system to be captured on the corresponding writing/reading device 26-32, and consequently to be used for the corresponding controlling operations. At the same time, the data captured can be stored on the RFID transponder 36 of the pig 34. Apart from determining the number of cycles that the pig 34 has already performed, this also makes it possible for example to capture possibly wear-relevant speed and/or material data. If for example the pig 34 is brought into contact with solvents for a comparatively high proportion of the time, this could mean greater wear of the pig 34 as compared with contact with chemically less aggressive materials. Something similar applies to the speed profiles that the pig 34 undergoes. For example, higher speeds over a longer period of time may mean greater wear of the pig 34.

After the completion of the coated item, it is possible to refer back to the data stored in the RFID transponder at a later stage in the life of the product, for example during a repair operation. Such a case is represented in the lower part of FIG. 2. A repair of the coating is being performed on the vehicle 50' in a workshop 66. In such a case, not just the composition of the coating material 16 can be read out from the transponder 62 of the vehicle 50', but the entire history of the coating material application, such as for example parameters of the coating operation, without an interface with the manufacturer being necessary. With these data, the repair coating can be adapted much more exactly to the original coating.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A coating system for coating an item with a coating material comprising:
   an application device for applying coating material to an item,
   a piggable line system for supplying the application device with the coating material, and
   a pig comprising a radio-frequency identification ("RFID") transponder, which is configured to store and/or to send and/or to receive data by means of RFID technology,
   wherein the data comprises
   application specific data comprising one or more of coating material data or coating operation data to be utilized by a controller which controls the application device based on the application specific data, and
   pig specific data, the pig specific data comprising one or more of pig location, pig speed, pig identification, pig running time, pig manufacture date, pig use by date, pig operating time, or a number of pig operating cycles.

2. The coating system as claimed in claim 1, further comprising an RFID reading/writing device which is designed to communicate with the RFID transponder.

3. The coating system as claimed in claim 2, wherein the RFID reading/writing device is designed to write the data onto the RFID transponder at a first pigging station and/or to read the data from the RFID transponder at a second pigging station.

4. The coating system as claimed in claim 2, wherein the RFID reading/writing device is designed to determine the location and/or speed of the pig from a signal emitted by the RFID transponder.

5. The coating system as claimed in claim 1, further comprising a control device, which is designed to activate the application device in dependence on the data.

6. The coating system as claimed in claim 1, wherein the pig specific data comprises a total number of times the pig has been brought into contact with each type of material.

7. The coating system as claimed in claim 1, wherein the data comprises data related to an item being coated by coating material transported by the pig.

8. The coating system as claimed in claim 1, wherein the coating operation data and/or the coating material data is for a particular coating material being transported by the pig.

9. The coating system as claimed in claim 1, wherein the data comprises vehicle body data.

10. A method for controlling a coating system as claimed in claim 1, comprising the steps of:
    storing the coating material data or the coating operations data by means of RFID technology on the pig at a first pigging station;
    moving the pig from the first pigging station to a second pigging station; reading the coating-relevant data located on the pig by means of RFID technology at the second pigging station;
    activating the application device with the data read,
    storing the pig specific data on the pig, the pig specific data comprising data which indicates each type of material the pig has been brought into contact with.

11. The method as claimed in claim 10, further comprising the step of controlling the application device, wherein controlling the application device comprises verifying the coating material data or the coating operations data read with further coating-relevant data provided by a control device.

12. The method of claim 10, further comprising the step of storing application specific data by means of the RFID technology on the pig during the application of the coating material.

13. The method as claimed in claim 10, further comprising the step of storing the total number of times the pig has been brought into contact with each type of material.

* * * * *